United States Patent
Lee

(10) Patent No.: US 11,618,405 B2
(45) Date of Patent: Apr. 4, 2023

(54) ROOF AIRBAG FOR VEHICLE

(71) Applicant: HYUNDAI MOBIS CO., LTD., Seoul (KR)

(72) Inventor: Dong Oh Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/395,408

(22) Filed: Aug. 5, 2021

(65) Prior Publication Data
US 2022/0063543 A1 Mar. 3, 2022

(30) Foreign Application Priority Data
Aug. 25, 2020 (KR) .................. 10-2020-0107341

(51) Int. Cl.
| B60R 21/214 | (2011.01) |
| B60R 21/233 | (2006.01) |
| B60R 21/2334 | (2011.01) |
| B60R 21/231 | (2011.01) |
| B60R 21/01 | (2006.01) |

(52) U.S. Cl.
CPC .......... *B60R 21/214* (2013.01); *B60R 21/233* (2013.01); *B60R 21/2334* (2013.01); *B60R 2021/01231* (2013.01); *B60R 2021/23192* (2013.01); *B60R 2021/23308* (2013.01); *B60R 2021/23316* (2013.01)

(58) Field of Classification Search
CPC . B60R 21/214; B60R 21/233; B60R 21/2334; B60R 21/231; B60R 21/237; B60R 21/213; B60R 2021/23192; B60R 2021/23308; B60R 2021/23107; B60R 2021/0048; B60R 2021/161; B60R 2021/0018; B60R 2021/23316; B60R 2021/2612; B60R 2021/01231
USPC .................................. 280/730.1, 729, 743.1
See application file for complete search history.

(56) References Cited

U.S. PATENT DOCUMENTS

| 2011/0163521 A1* | 7/2011 | Gammill | B60R 21/2171 248/220.21 |
| 2018/0265029 A1* | 9/2018 | Min | B60R 21/23 |
| 2018/0312130 A1* | 11/2018 | Min | B60R 21/13 |
| 2021/0138987 A1* | 5/2021 | Lee | B60R 21/2334 |
| 2021/0138996 A1* | 5/2021 | Min | B60R 21/2646 |

FOREIGN PATENT DOCUMENTS

KR 10-2018-0105997 10/2018

* cited by examiner

*Primary Examiner* — Keith J Frisby
(74) *Attorney, Agent, or Firm* — DLA Piper LLP (US)

(57) ABSTRACT

A roof airbag for a vehicle. The roof airbag includes: a main cushion located at a roof panel of the vehicle and configured to be unfolded from a first side portion to a second side portion of the roof panel when being operated; a sub cushion coupled to a side surface of the extended main cushion and unfolded outside the main cushion; and an inflator located at the roof panel of the vehicle and connected to the main cushion or the sub cushion, and configured to inject gas into the main cushion and the sub cushion to unfold the main cushion and the sub cushion.

10 Claims, 4 Drawing Sheets

−Prior Art−

ROOF AIRBAG FOR VEHICLE

CROSS REFERENCE TO RELATED APPLICATION

The present application claims priority to Korean Patent Application No. 10-2020-0107341, filed Aug. 25, 2020, the entire contents of which is incorporated herein for all purposes by this reference.

BACKGROUND OF THE INVENTION

Field of the Invention

The present invention relates to a roof airbag for a vehicle and, more particularly, to a vehicle roof airbag capable of preventing a passenger from bodily injury or from being ejected from the vehicle when a vehicle accident occurs.

Description of the Related Art

In general, a vehicle includes an airbag device for safety of a passenger. A general airbag device includes an inflator and a main cushion. When the vehicle receives an external impact over a predetermined degree, the inflator supplies gas into the main cushion to unfold the main cushion, so that the passenger is protected.

The airbag device may be mounted to a predetermined portion of the vehicle, e.g., a steering wheel mounted to an instrument panel, an upper end of a glove box, and a side portion inside the vehicle, etc., depending on specification of the vehicle, an object to be protected, etc.

Specifically, a roof airbag is a kind of airbag device that is mounted to a roof of the vehicle and is unfolded above the passenger to protect the passenger. The roof airbag shields an opening of a sunroof provided on the vehicle while being unfolded during an emergency event, so that the passenger can be prevented from being ejected through the opening of the sunroof and the roof airbag reduces an impact acting on the passenger and injuries to the passenger may be reduced.

However, when the roof airbag is unfolded, a non-protecting area is generated depending on the shape of the main cushion in the roof airbag (the non-protecting area is an area generated when the roof airbag is contracted depending on the shape of the main cushion), so protection of the roof airbag does not reach to the non-protecting area.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a roof airbag for a vehicle, wherein the roof airbag is configured such that a main cushion unfolded from a roof of the vehicle is coupled to a sub cushion at opposite ends of the unfolded main cushion so as to protect a passenger in non-protecting areas, by the sub cushion, not protecting the passenger due to contraction of the main cushion during unfolding of the main cushion.

According to the present invention, the roof airbag for a vehicle includes: a main cushion located at a roof panel of the vehicle and configured to be unfolded from a first side portion to a second side portion of the roof panel when being operated; a sub cushion coupled to a side surface of the extended main cushion and unfolded outside the main cushion; and an inflator located at the roof panel of the vehicle and connected to the main cushion or the sub cushion, and configured to inject gas into the main cushion and the sub cushion to unfold the main cushion and the sub cushion.

The sub cushion may be extended in an unfolded direction of the main cushion and be configured to be unfolded after the main cushion is unfolded.

An outside portion of the sub cushion may be temporarily joined to the main cushion while the sub cushion may be folded toward the main cushion, and when the gas is injected into the sub cushion after the main cushion is unfolded, temporary joining of the sub cushion may be released.

The roof airbag may include: a communication portion through which the main cushion and the sub cushion communicate with each other.

The inflator may be connected to a first side portion of the main cushion, and the communication portion may be provided at a second side portion of the main cushion and allow the main cushion and the sub cushion to communicate with each other, so that the sub cushion may be unfolded after the main cushion is unfolded.

The main cushion may include a seam portion by which an upper surface and a lower surface of the main cushion may be joined to guide a flow of the gas injected into the main cushion.

The seam portion may be configured to guide the flow of the gas such that the gas is injected to an inside portion of the main cushion after the main cushion is unfolded from the first side portion to the second side portion of the roof panel and the gas flows to an outside portion from the inside portion of the main cushion.

The inflator may be connected to both a first bracket and a clamp to be coupled to the roof panel.

The roof airbag may include: a second bracket coupled to the first side portion of the roof panel of the vehicle and coupled to both the main cushion and the sub cushion.

The roof airbag may include: a guide device coupled to the roof panel of the vehicle, and connected to opposite ends of the unfolded main cushion, and extended in an unfolded direction of the main cushion to guide unfolding of the main cushion from the first side portion to the second side portion of the roof panel.

The guide device may include: a wire mounted to the roof panel of the vehicle and extended in the unfolded direction of the main cushion; and a connecting portion connecting the main cushion to the wire.

According to the present invention, the roof airbag for a vehicle is configured such that the main cushion is unfolded from the first side portion to the second side portion of the roof of the vehicle and the main cushion is coupled to the sub cushion. Therefore, the non-protecting areas generated due to contraction of the main cushion during unfolding of the main cushion are covered by the sub cushion, whereby the probability of the passenger being injured can be reduced.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
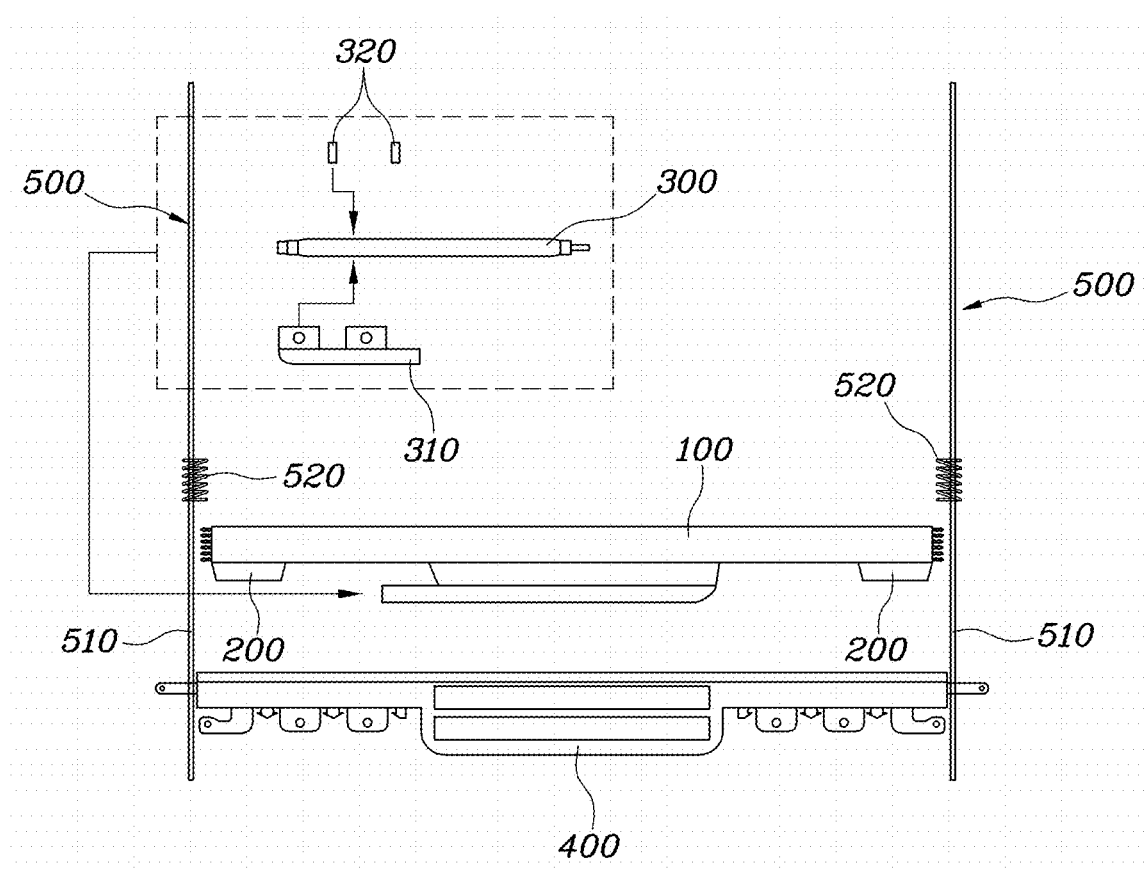
FIG. 1 is an exploded front view showing a roof airbag for a vehicle according to an embodiment of the present invention.

In the following description, the structural or functional description specified to an exemplary embodiment according to the concept of the present invention is intended to describe the exemplary embodiments, so it should be understood that the present invention may be variously embodied, without being limited to the exemplary embodiment.

An embodiment described herein may be changed in various ways and various shapes, so a specific embodiment is shown in the drawings and will be described in detail in this specification. However, it should be understood that the exemplary embodiment according to the concept of the present invention is not limited to the embodiment which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment will be described hereafter in detail with reference to the accompanying drawings. Like reference numerals given in the drawings indicate like components.

Figure 2:
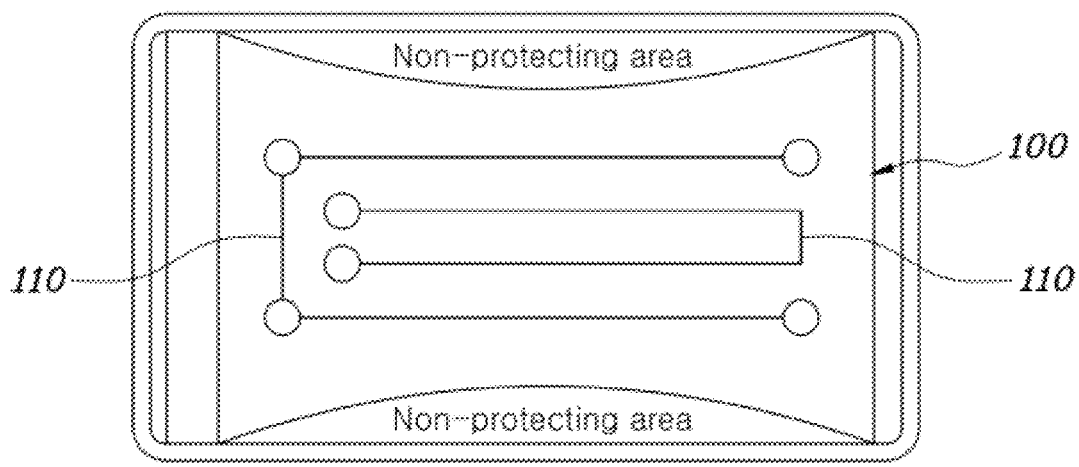
FIG. 2 is a plan view showing a conventional roof airbag for a vehicle.
Figure 3:
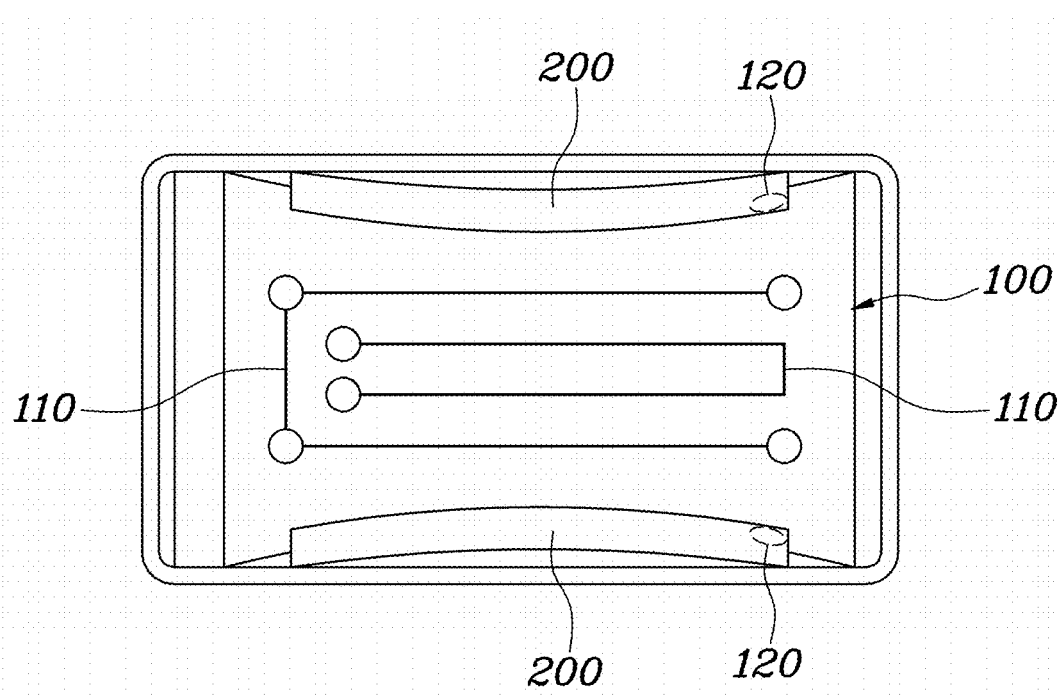
FIG. 3 is a plan view showing the roof airbag for a vehicle according to the embodiment of the present invention.
Figure 4:
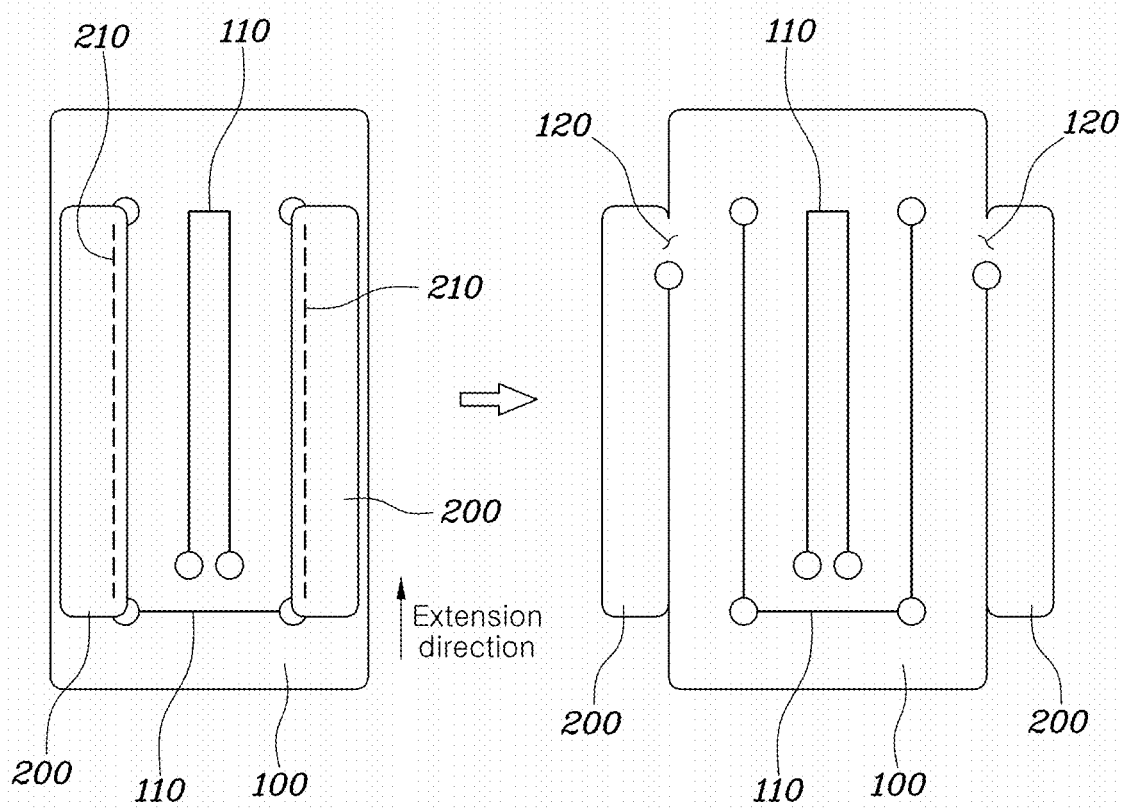
FIG. 4 is a plan view showing a process in which a sub cushion of the roof airbag for a vehicle according to the embodiment of the present invention is unfolded.

FIG. 1 is an exploded front view showing a roof airbag for a vehicle according to an embodiment of the present invention. FIG. 2 is a plan view showing a conventional roof airbag for a vehicle. FIG. 3 is a plan view showing the roof airbag for a vehicle according to the embodiment of the present invention. FIG. 4 is a plan view showing a process in which a sub cushion 200 of the roof airbag for a vehicle according to the embodiment of the present invention is unfolded.

Hereinbelow, a roof airbag for a vehicle according to an exemplary embodiment of the present invention will be described with reference to FIGS. 1 to 4.

As shown in FIG. 2, in a conventional airbag for a vehicle, a main cushion 100 is contracted in a direction intersected with an unfolding direction of the main cushion 100 due to a seam portion 110 that is a joint of an upper portion and a lower portion of the main cushion 100 in order to guide gas injected into the airbag.

As a result, at opposite ends of the unfolded main cushion 100, non-protecting areas in which a passenger is not protected by the main cushion 100 are generated. The passenger may be injured due to the non-protecting areas.

The roof airbag for a vehicle according to the embodiment of the present invention is designed for minimizing the non-protecting areas generated by the conventional roof airbag for a vehicle so as to reduce injuries to the passengers.

According the present invention, the roof airbag for a vehicle includes: a main cushion 100 located at a roof panel of the vehicle and unfolded from a first side portion to a second side portion of the roof panel when being operated; a sub cushion 200 coupled to a side surface of the extended main cushion 100 and unfolded outward from the main cushion 100; and an inflator 300 located at the roof panel of a vehicle and connected to the main cushion 100 or the sub cushion 200, and configured to inject gas into the main cushion 100 and the sub cushion 200 to unfold the main cushion 100 and the sub cushion 200.

As shown in FIGS. 1 to 3, the main cushion 100 is located at the roof panel of the vehicle and may be unfolded from the first side portion to the second side portion of the roof panel.

According to the embodiment of the present invention, the main cushion 100 of the roof airbag for a vehicle is designed to be mounted in the front of the roof panel and to be unfolded rearward. However, the main cushion may be unfolded forward from the rear of the roof panel.

The main cushion 100 may prevent a passenger from being ejected outward from the vehicle interior through a sunroof when the vehicle rolls over, or may protect the passenger from being injured due to contact with the roof panel.

The sub cushion 200 may be unfolded from the opposite ends of the unfolded main cushion 100 in a direction intersected with the unfolded direction of the main cushion 100.

Therefore, the sub cushion 200 is contracted in the direction intersected with the unfolded direction of the main cushion 100 when the main cushion 100 is unfolded, so that the sub cushion 200 may protect the passenger at the non-protecting areas where the passenger is not protected by the main cushion.

Accordingly, during a collision or a roll-over accident of a vehicle, the upper portion of the passenger can be protected as the main cushion 100 and the sub cushion 200 are unfolded at the roof side of the vehicle.

The inflator 300 is located at the roof panel and connected to the main cushion 100. The main cushion 100 communicates with the sub cushion 200, so the gas may be injected into the main cushion 100 and the sub cushion 200 to unfold the main cushion 100 during an accident of the vehicle.

The sub cushion 200 is extended in the unfolded direction of the main cushion 100 and may be unfolded after the main cushion 100 is unfolded.

The sub cushion 200 is extended in the unfolded direction of the main cushion 100. The sub cushion 200 is positioned at the opposite ends of the unfolded main cushion 100 and is unfolded in the direction intersected with the unfolded direction of the main cushion 100. The sub cushion 200 is unfolded after the main cushion 100 is unfolded first.

Accordingly, the main cushion 100 that covers a central portion of the roof panel where the probability of the passenger being injured in a collision or a roll-over accident of the vehicle is high is unfolded first. Then, the sub cushion 200 is unfolded so as to protect the non-protecting areas not protecting the passenger due to contraction of the main cushion 100.

The sub cushion 200 in a state of being folded toward the main cushion 100 is coupled to the sub cushion 200 such that an outside portion thereof is temporarily joined 210 to the main cushion 100 and the temporary joining 210 may be released after the main cushion 100 is unfolded and the gas is injected into the sub cushion 200.

The sub cushion 200 is folded toward the main cushion 100 and is located at the roof panel, and may be unfolded when folding of the sub cushion 200 is released after the main cushion 100 is unfolded.

When the sub cushion 200 is folded toward the main cushion 100, the sub cushion 200 may be temporarily joined 210 to the main cushion 100 and the temporary-joining 210 may be released by pressure of the gas injected from the inflator 300.

Therefore, the main cushion 100 is unfolded first to cover the central portion of the roof panel, and the sub cushion 200 is unfolded to protect the non-protecting areas where the passenger is not protected by the main cushion 100.

A communication portion 120 may be formed to allow the main cushion 100 and the sub cushion 200 to communicate with each other.

The main cushion 100 and the sub cushion 200 communicate with each other through the communication portion 120. The inflator 300 is connected to the main cushion 100 to inject the gas into the main cushion 100 and the gas injected into the main cushion 100 may be injected into the sub cushion 200 through the communication portion 120.

With one inflator 300, both the main cushion 100 and the sub cushion 200 may be unfolded and the main cushion 100 and the sub cushion 200 may be unfolded in order.

The inflator 300 is connected to a first side portion of the main cushion 100 and the communication portion 120 is formed at a second side portion of the main cushion 100 to allow the main cushion 100 and the sub cushion 200 to communicate with each other, whereby the sub cushion 200 is unfolded after the main cushion 100 is unfolded.

The inflator 300 is connected to the first side portion of the main cushion 100 to inject the gas into the first side portion of the main cushion 100, so that the main cushion 100 is unfolded from the first side portion to the second side portion thereof. The communication portion 120 is formed at the second side portion of the main cushion 100, so the gas may be injected into the sub cushion 200 through the communication portion 120 after the main cushion 100 is fully unfolded to the second side portion thereof.

As the communication portion 120 is located at the second side portion of the main cushion 100, the sub cushion 200 may be unfolded after the main cushion 100 is fully unfolded from the first side portion to the second side portion thereof.

The main cushion 100 may include the seam portion 110. The seam portion 110 joins the upper and lower surfaces of the main cushion 100 to guide a flow of the gas injected into the main cushion 100.

The seam portion 110 may join the upper and lower surfaces of the main cushion 100 to each other to guide a flow direction of the gas injected from the inflator 300 into the main cushion 100. The gas may flow uniformly through the seam portion 110 from the first side portion to the second side portion of the main cushion 100 and the main cushion 100 may be unfolded quickly.

The seam portion 110 guides a flow of the gas, so that the main cushion 100 is unfolded from the first side portion to the second side portion of the roof panel and the gas flows to an outside portion inside the main cushion 100 and then is injected into an inside portion of the main cushion 100.

As shown in FIG. 3, a plurality of U-shaped seam portions 110 is provided, and formed such that, a U-shaped opening portion of one seam portion is located to face the second side portion of the main cushion 100, and a U-shaped opening portion of another seam portion 110 may be located to face the first side portion of the main cushion 100.

Accordingly, the gas injected into the main cushion 100 is injected into the outside portion of the main cushion 100 first, as the gas is injected into the inside of main cushion from the first side portion to the second portion through a first seam portion 110. Then, a flow of the gas may be guided to a central portion of the main cushion 100 by a second seam portion 110.

The inflator 300 may be connected to a first bracket 310 and a clamp 320 to be connected to the roof panel.

As shown in FIG. 1, the inflator 300 is fixed to the first bracket 310 by the clamp 320 and the first bracket 310 is coupled to the roof panel thereby locating the inflator 300 at the roof panel.

Therefore, the inflator 300 may be connected to the main cushion 100 located at the roof panel by the shortest distance.

The roof airbag includes a second bracket 400 coupled to the first side portion of the roof panel of the vehicle and coupled to both the main cushion 100 and the sub cushion 200.

The main cushion 100 and the sub cushion 200 are coupled to the second bracket 400 to be located at the roof panel of the vehicle. The second bracket 400 is coupled to the first side portion of the roof panel to locate the main cushion 100 and the sub cushion 200, so that the main cushion 100 is unfolded from the first side portion to the second side portion of the roof panel and then the sub cushion 200 is unfolded.

The roof airbag includes a guide device 500. The guide device 500 is coupled to the roof panel of the vehicle, connected to the opposite ends of the unfolded main cushion 100, extended in the unfolded direction of the main cushion 100 to guide the unfolding of the main cushion 100 from the first side portion to the second side portion of the roof panel.

As shown in FIG. 1, the guide device 500 connects the opposite ends of the unfolded main cushion 100 to the roof panel. Therefore, the main cushion 100 may be located in a plane parallel to an extended plane of the roof panel. In a case of a vehicle with a sunroof, the guide device 500 may guide the main cushion 100 to be unfolded to a location corresponding to the sunroof when the main cushion 100 is unfolded.

The guide device 500 may include: a wire 510 mounted to the roof panel of the vehicle and extended in the unfolded direction of the main cushion 100; and a connecting portion 520 connecting the main cushion 100 to the wire 510.

As shown in FIG. 1, the guide device 500 includes: the wire 510 connected to the roof panel and extended in the longitudinal direction; and the connecting portion 520 connecting the wire 510 to the main cushion 100. The connecting portion 520 may be moved along the wire 510 in an extended direction of the wire 510, and the connecting portion 520 may guide the unfolding of the main cushion 100 in the extended direction of the wire 510 when the main cushion 100 is unfolded.

Accordingly, the main cushion 100 may be unfolded quickly along the wire 510 to a precise location thereof.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A roof airbag for a vehicle, the roof airbag comprising:
   a main cushion located at a roof panel of the vehicle and configured to be unfolded from a first side portion to a second side portion of the roof panel when being operated;
   a sub cushion coupled to a side surface of the main cushion and unfolded outside the main cushion; and
   an inflator located at the roof panel of the vehicle and connected to the main cushion or the sub cushion, and configured to inject gas into the main cushion and the sub cushion to unfold the main cushion and the sub cushion, wherein an outside portion of the sub cushion is temporarily joined to the main cushion while the sub cushion is folded toward the main cushion, and when the gas is injected into the sub cushion after the main cushion is unfolded, temporary joining of the sub cushion is released.

2. The roof airbag of claim 1, wherein the sub cushion is extended in an unfolded direction of the main cushion and is configured to be unfolded after the main cushion is unfolded.

3. The roof airbag of claim 1, further comprising:
   a communication portion through which the main cushion and the sub cushion communicate with each other.

4. The roof airbag of claim 3, wherein the inflator is connected to a first side portion of the main cushion, and
   the communication portion is provided at a second side portion of the main cushion and allows the main cushion and the sub cushion to communicate with each other, so that the sub cushion is unfolded after the main cushion is unfolded.

5. The roof airbag of claim 1, wherein the main cushion includes a seam portion by which an upper surface and a lower surface of the main cushion are joined to guide a flow of the gas injected into the main cushion.

6. The roof airbag of claim 5, wherein the seam portion is configured to guide the flow of the gas such that the gas is injected to an inside portion of the main cushion after the main cushion is unfolded from the first side portion to the second side portion of the roof panel.

7. The roof airbag of claim 1, wherein the inflator is connected to a first bracket and a clamp to be coupled to the roof panel.

8. The roof airbag of claim 1, further comprising:
   a second bracket coupled to the first side portion of the roof panel of the vehicle and coupled to the main cushion and the sub cushion.

9. The roof airbag of claim 1, further comprising:
   a guide device coupled to the roof panel of the vehicle, and connected to opposite ends of the unfolded main cushion, and extended in an unfolded direction of the main cushion to guide unfolding of the main cushion from the first side portion to the second side portion of the roof panel.

10. The roof airbag of claim 9, wherein the guide device comprises:
    a wire mounted to the roof panel of the vehicle and extended in the unfolded direction of the main cushion; and
    a connecting portion connecting the main cushion to the wire.

* * * * *